United States Patent
Fauri

(10) Patent No.: US 12,291,322 B2
(45) Date of Patent: May 6, 2025

(54) DRIVE SYSTEM OF AN AIRCRAFT, AIRCRAFT AND METHOD FOR OPERATING AN AIRCRAFT

(71) Applicant: Dr. Ing. h.c. F. Porsche Aktiengesellschaft, Stuttgart (DE)

(72) Inventor: Mikel Fauri, Ludwigsburg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 343 days.

(21) Appl. No.: 17/725,563

(22) Filed: Apr. 21, 2022

(65) Prior Publication Data

US 2022/0348311 A1  Nov. 3, 2022

(30) Foreign Application Priority Data

Apr. 23, 2021  (DE) ............. 10 2021 110 378.9

(51) Int. Cl.
*B64C 13/26* (2006.01)
*B60L 3/00* (2019.01)
(Continued)

(52) U.S. Cl.
CPC ............ *B64C 13/26* (2013.01); *B60L 3/0053* (2013.01); *B64C 29/0008* (2013.01);
(Continued)

(58) Field of Classification Search
CPC ..... B64C 13/26; B64C 29/0008; B64C 29/00; B64D 27/24; B64D 37/02; B64D 41/00;
(Continued)

(56) References Cited

U.S. PATENT DOCUMENTS 9,028,990 B2 *  5/2015  Gans ................ H01M 8/04007
                                                                429/428
9,376,208 B1     6/2016  Gentry
                            (Continued)

FOREIGN PATENT DOCUMENTS

DE   102006020508 A1   10/2007
DE   102017006543 A1   1/2019
DE   102018116161 A1   1/2020

*Primary Examiner* — Medhat Badawi
*Assistant Examiner* — Vicente Rodriguez
(74) *Attorney, Agent, or Firm* — LEYDIG, VOIT & MAYER, LTD.

(57) ABSTRACT

A drive system of an aircraft, including a fuel cell, which can be supplied with hydrogen from a hydrogen tank and with air from a blower, the fuel cell being configured to provide drive power for operational flight after takeoff and before landing dependent on a hydrogen mass flow supplied by the hydrogen tank and dependent on an air mass flow supplied by the blower, and an electrical energy store, which is configured to provide additional drive power for takeoff and landing, wherein an additional hydrogen tank and an air or oxygen tank are configured to interact with the fuel cell such that the fuel cell can be supplied with an additional hydrogen mass flow and with an additional air or oxygen mass flow, thereby compensating at least partially for a loss of the additional drive power provided by the electrical energy store for landing.

12 Claims, 2 Drawing Sheets

(51) Int. Cl.
*B64C 29/00* (2006.01)
*B64D 27/24* (2006.01)
*B64D 37/02* (2006.01)
*B64D 41/00* (2006.01)
*H01M 8/04082* (2016.01)
*H01M 8/04089* (2016.01)
*H01M 8/04746* (2016.01)
*H01M 8/22* (2006.01)

(52) U.S. Cl.
CPC ............ *B64D 27/24* (2013.01); *B64D 37/02* (2013.01); *B64D 41/00* (2013.01); *H01M 8/04089* (2013.01); *H01M 8/04201* (2013.01); *H01M 8/04753* (2013.01); *H01M 8/22* (2013.01); *B60L 2200/10* (2013.01); *B64D 2041/005* (2013.01); *H01M 2250/20* (2013.01)

(58) Field of Classification Search
CPC ............ B64D 2041/005; B64D 37/30; H01M 8/04089; H01M 8/04201; H01M 8/04753; H01M 8/22; H01M 2250/20; H01M 2220/20; H01M 8/04686; H01M 16/003; B60L 3/0053; B60L 2200/10; Y02T 50/60; Y02T 90/40
See application file for complete search history.

(56) References Cited

U.S. PATENT DOCUMENTS

| | | | |
|---|---|---|---|
| 11,365,012 B2* | 6/2022 | Rainville | H01M 8/04753 |
| 2003/0075643 A1* | 4/2003 | Dunn | B64D 27/24 244/59 |
| 2014/0141345 A1* | 5/2014 | Morita | H01M 8/04097 429/415 |
| 2018/0337418 A1 | 11/2018 | Ahn | |
| 2020/0395626 A1 | 12/2020 | Grishashvili | |
| 2022/0013796 A1* | 1/2022 | Igarashi | H01M 8/04686 |
| 2022/0194579 A1* | 6/2022 | Kelly | B64D 37/30 |
| 2023/0402629 A1* | 12/2023 | Sessions | H01M 8/04425 |

* cited by examiner

DRIVE SYSTEM OF AN AIRCRAFT, AIRCRAFT AND METHOD FOR OPERATING AN AIRCRAFT

CROSS REFERENCE TO RELATED APPLICATIONS

This application claims benefit to German Patent Application No. DE 10 2021 110 378.9, filed on Apr. 23, 2021, which is hereby incorporated by reference herein.

FIELD

The invention relates to a drive system of an aircraft. The invention also relates to an aircraft and to a method for operating an aircraft.

BACKGROUND

DE 10 2018 116 161 A1 discloses an aircraft, designed as a vertical takeoff aircraft, with a fuselage and a passenger compartment provided by the fuselage. The passenger compartment is also referred to as the passenger cabin. The aircraft according to DE 10 2018 116 161 A1 has a fully electric drive system.

DE 10 2017 006 543 A1 discloses an aerial vehicle with a fuel cell drive. The fuel cell drive has a fuel cell. The fuel cell is supplied with hydrogen from a hydrogen tank. The fuel cell is also supplied with air, to be specific from a compressor or blower.

US 2020/0395626 A1 discloses an oxygen booster for peak power in a fuel cell system.

SUMMARY

In an embodiment, the present disclosure provides a drive system of an aircraft, which provides drive power for takeoff, landing and an operational flight after takeoff and before landing, comprising a fuel cell as a first power source, which can be supplied with hydrogen from a hydrogen tank and with air from a blower, the fuel cell being configured to provide drive power for the operational flight after takeoff and before landing dependent on a hydrogen mass flow supplied by the hydrogen tank and dependent on an air mass flow supplied by the blower, and an electrical energy store as a second power source, which is configured to provide additional drive power for takeoff and landing, wherein an additional hydrogen tank and an air or oxygen tank are configured to interact with the fuel cell such that, in the event of failure of the electrical energy store, the fuel cell can be supplied with an additional hydrogen mass flow from the additional hydrogen tank and with an additional air or oxygen mass flow from the air or oxygen tank, thereby compensating at least partially for a loss of the additional drive power provided by the electrical energy store for landing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
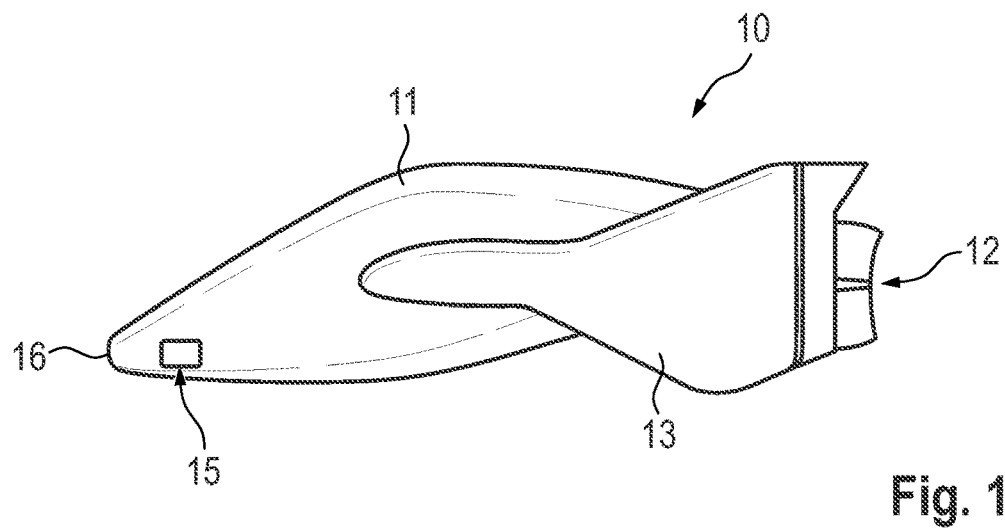
FIG. 1 shows a side view of an aircraft.

Embodiments of the present invention provide a novel drive system of an aircraft, an aircraft with such a drive system and a method for operating such an aircraft.

The drive system according to an embodiment of the invention has a fuel cell as a first power source.

The fuel cell can be supplied with hydrogen from a hydrogen tank and with air from a blower. The fuel cell is designed to provide drive power for the operational flight of the aircraft after takeoff and before landing in a way dependent on a hydrogen mass flow supplied by the hydrogen tank and dependent on an air mass flow supplied by the blower.

The drive system according to an embodiment of the invention also has an electrical energy store as a second power source.

The electrical energy store is designed to provide additional drive power for the takeoff and landing of the aircraft.

In the case of the drive system according to an embodiment of the invention, an additional hydrogen tank and an air or oxygen tank interact with the fuel cell in such a way that, in the event of failure of the electrical energy store, the fuel cell can be supplied with an additional hydrogen mass flow from the additional hydrogen tank and with an additional air or oxygen mass flow from the air or oxygen tank, in order to compensate at least partially for the loss of the drive power provided by the electrical energy store for landing the aircraft.

The drive system according to an embodiment of the invention is a hybrid system in which drive power for the aircraft can be provided on the one hand from a fuel cell and on the other hand from an electrical energy store.

The fuel cell, the hydrogen tank interacting with the fuel cell and also the blower interacting with the fuel cell are designed to provide drive power for the regular operational flight of the aircraft after takeoff and before landing.

Increased drive power required for the takeoff and landing of the aircraft is provided by the second power source, that is to say by the electrical energy store.

Should the electrical energy store fail, increased drive power can be provided by way of the fuel cell, to be specific by using the additional hydrogen tank and also the air or oxygen tank, for a defined time period, in order to compensate at least partially for the drive power no longer provided by the electrical energy store due to its failure by using the fuel cell for the landing of the aircraft. It is therefore possible to dispense with a second or redundant electrical energy store and nevertheless to make safe landing possible.

Preferably, the additional hydrogen tank is connected by way of an activatable valve to a hydrogen line leading to the fuel cell. The air or oxygen tank is connected by way of an activatable valve to an air line leading to the fuel cell. A control device is designed to activate the valves to open in the event of failure of the electrical energy store. This advantageously makes it possible in the event of failure of the electrical energy store to use the fuel cell to compensate for the failure of the electrical energy store with regard to providing drive power.

Preferably, the additional hydrogen tank is given such a capacity and filled with such an amount of hydrogen and the air or oxygen tank is given such a capacity and filled with such an amount of air or oxygen that the additional hydrogen mass flow supplied by the additional hydrogen tank and the additional air or oxygen mass flow supplied by the air or oxygen tank are sufficient to compensate for the loss of the drive power provided by the electrical energy store for a time period required for landing. In this way it can be ensured that the aircraft can land safely in spite of the failure of the electrical energy store.

Figure 2:
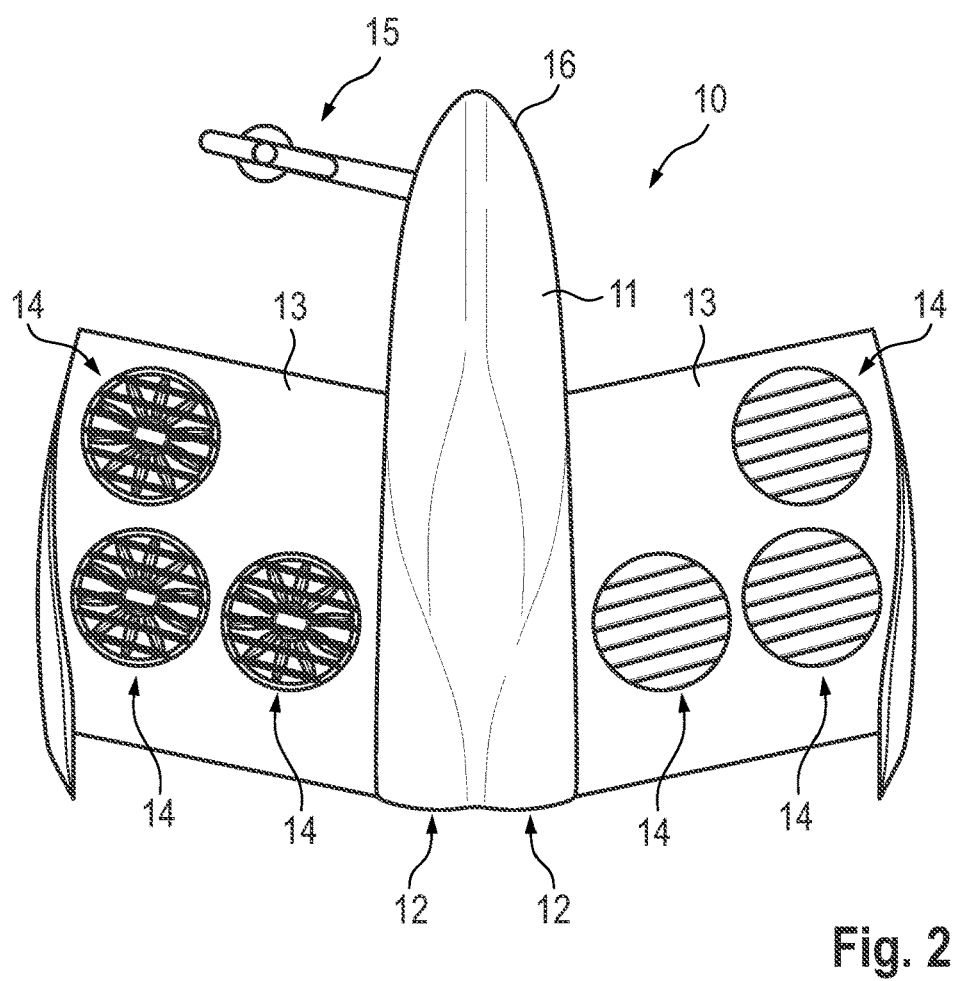
FIG. 2 shows a plan view of the aircraft.

FIGS. 1 and 2 show different views of an aircraft 10. The aircraft 10 has a fuselage 11, which among other things provides a passenger compartment. The aircraft 10 also has wings 13, which engage on the fuselage 11.

The aircraft 10 is a so-called vertical takeoff aircraft which, upon takeoff, lifts off from the ground vertically and, upon landing, lands on the ground vertically.

In order to make such vertical takeoff and landing of the aircraft 10 possible, the aircraft 10 has at least in the region of each wing 13 at least one wing lift unit 14 in each case, also referred to as a WLU. In the exemplary embodiment shown, for each wing 13 three such wing lift units 14 are provided in each case.

The vertical takeoff and landing of the aircraft 10 that takes place through the use of the wing lift units 14 can be assisted by means of at least one nose lift unit 15, which engages on a nose 16 of the fuselage 11 of the aircraft 10. A nose lift unit 15 is also referred to as an NLU.

FIGS. 1 and 2 show such a nose lift unit 15, which is positioned on one side of the fuselage 11. It is also possible for two such nose lift units 15 to be used. The nose lift units 15 are preferably pivotable relative to the fuselage 11, to be specific such that the respective nose lift unit 15 is pivoted out of the fuselage 11 for takeoff and landing, whereas the respective nose lift unit 15 is pivoted into the fuselage 11 for operational flight after takeoff and before landing of the aircraft 10.

For the forward thrust or operational flight of the aircraft 10 after it has taken off and before it lands, the aircraft 10 has at least one forward thrust unit 12, in the exemplary embodiment shown two forward thrust units 12, which are integrated into the tail of the fuselage 11.

Figure 3:
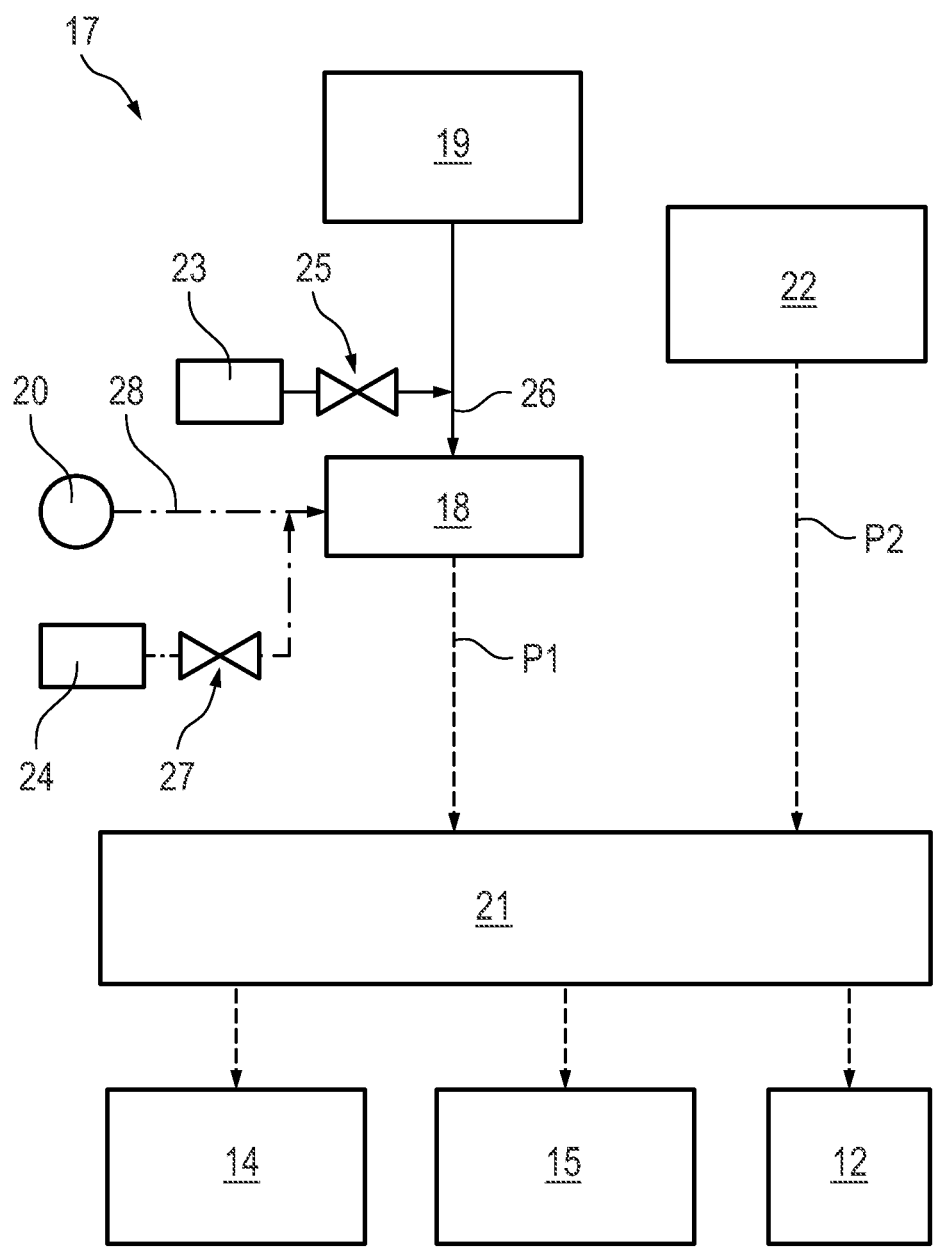
FIG. 3 shows a schematic representation of a drive system of the aircraft.

FIG. 3 shows a block diagram of a drive system 17 of the aircraft 10. The drive system 10 has a fuel cell 18 as a first power source. The fuel cell 18 can be supplied with hydrogen from a hydrogen tank 19.

The fuel cell 18 can also be supplied with air and consequently oxygen from a blower 20. Dependent on the hydrogen supplied to it and the oxygen supplied to it, the fuel cell 18 generates electrical energy or electrical power P1, which the fuel cell 18 provides to a power split unit 21.

The fuel cell 18 is designed to provide electrical power, and consequently drive power, designed for the actual operational flight and consequently the forward thrust of the aircraft 10 after takeoff and before landing, in a way dependent on a hydrogen mass flow supplied to the fuel cell 18 by the hydrogen tank 19 and dependent on an air mass flow supplied to the fuel cell 18 by the blower 20.

The drive system 17 has an electrical energy store 22 as a second power source. The electrical energy store 22 provides additional drive power P2, to be specific drive power for the takeoff and landing of the aircraft. The electrical energy store 22 in turn provides this additional drive power P2 to the power split unit 21.

The power split unit 21 can split the drive power provided by the fuel cell 18 and by the electrical energy store 22 and provide it to different assemblies of the aircraft 10, thus for example to the wing lift units 14, the nose lift unit 15 and the forward thrust unit 12.

As already stated above, the forward thrust unit 12 serves for providing the forward thrust of the aircraft after it has taken off, that is to say for regular operational flight of the aircraft 10 after takeoff and before landing. The wing lift units 14 and the nose lift unit 15 serve for the vertical takeoff and vertical landing of the aircraft 10.

As already stated above, the fuel cell 18 is designed such that it can provide the drive power required at the forward thrust unit 12 for the operational flight of the aircraft 10 after takeoff of the aircraft 10 and before landing of the aircraft 10.

A much higher drive power is required for the takeoff of the aircraft 10 and landing of the aircraft 10 and this power is additionally provided by the electrical energy store 22.

Should the electrical energy store 22 fail, the drive power provided by the fuel cell 18 is then no longer sufficient for safe landing of the aircraft 10. A redundant electrical energy store would then be required.

Failure of the electrical energy store 22 should be understood as meaning that it either fails due to a defect or is depleted of charge. A failure of the electrical energy store 22 therefore has the effect that it cannot provide drive power P2 for the landing of the aircraft 10, that the drive power is therefore not available for landing and is accordingly lost. In order to be able to dispense with a redundant electrical energy store, and nevertheless make safe landing of the aircraft 10 possible in the event of failure of the electrical energy store 22, an additional hydrogen tank 23 and an air or oxygen tank 24 interact with the fuel cell 18.

In the event of failure of the electrical energy store 22, the fuel cell 18 can be supplied with an additional hydrogen mass flow from the additional hydrogen tank 23 and with an additional air or oxygen mass flow from the air or oxygen tank 24, in order to increase the drive power P1 generated by the fuel cell 18 and therefore compensate at least partially for the loss of the drive power P2 provided by the electrical energy store 22 for landing the aircraft 10.

The additional hydrogen tank 23 is connected by way of an activatable valve 25 to a hydrogen line 26 leading to the fuel cell 18. The air or oxygen tank 24 is connected by way of an activatable valve 27 to an air line 28 likewise leading to the fuel cell 18. A control device can be used to activate these two valves 25 and 27 to open, to be specific in the event of failure of the electrical energy store 22.

The additional hydrogen tank 23 and the air or oxygen tank 24 are given such a capacity and filled with such an amount of hydrogen and air or oxygen that the additional hydrogen mass flow supplied by the hydrogen tank 23 and the additional air mass flow supplied by the air or oxygen tank 24 are sufficient to compensate for the loss of the drive power P2 provided by the electrical energy store 22 for a time period required for landing.

Embodiments of the invention relate not only to the drive system 17 of the aircraft 10, but also to the aircraft 10 with such a drive system 17.

The aircraft 10 is preferably a manned aircraft; the fuselage 11 then provides a passenger compartment. The aircraft 10 is preferably a vertical takeoff aircraft.

Embodiments of the invention also relate to a method for operating an aircraft. In the case of the method according to embodiments of the invention, whenever the electrical energy store 22 fails, the fuel cell 18 is supplied with an additional hydrogen mass flow from the additional hydrogen tank and with an additional air or oxygen mass flow from the air or oxygen tank 24, in order to compensate at least partially for the loss of the drive power P2 provided by the electrical energy store 22 for landing the aircraft 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A drive system for providing drive power to a vertical lift unit or a thrust unit of an aircraft for takeoff, landing and an operational flight after takeoff and before landing, the drive system comprising:
    the thrust unit configured to:
        generate forward thrust for the operational flight; and
        receive a first power for the operational flight,
    the vertical lift unit configured to:
        generate vertical lift for the takeoff and the landing of the aircraft; and
        receive the first power for the operational flight and a second power for the takeoff and the landing,
    a power splitter unit configured to:
        receive the first power from a fuel cell and the second power from an electrical energy store;
        provide the first power to the thrust unit and the vertical lift unit; and
        provide the second power to the vertical lift unit, wherein when the power splitter unit does not receive the second power in response to a failure of the electrical energy store, the power splitter unit receives an increased amount of power from the first power based on an additional hydrogen mass flow from an additional hydrogen tank,
    the fuel cell configured as a first power source for the drive power, the fuel cell operatively coupled to a hydrogen tank that is configured to supply hydrogen to the fuel cell and operatively coupled to a blower that is configured to supply air to the fuel cell, the fuel cell configured to provide the first power of the drive power for the operational flight after the takeoff and before the landing based on a hydrogen mass flow supplied by the hydrogen tank and based on an air mass flow supplied by the blower;
    the electrical energy store configured as a second power source for the drive power and configured to provide at least a portion of the drive power for the takeoff and the landing as the second power; and
    the additional hydrogen tank and an air or oxygen tank operatively and controllably coupled to the fuel cell such that, in response to the failure of the electrical energy store, the fuel cell is supplied with the additional hydrogen mass flow from the additional hydrogen tank and with an additional air or oxygen mass flow from the air or oxygen tank.

2. The drive system as claimed in claim 1, the drive system further comprising:
    a first activatable valve connecting the additional hydrogen tank to a hydrogen line leading to the fuel cell, the first activatable value being configured to be activated in response to the failure of the electrical system to supply the additional hydrogen mass flow to the fuel cell.

3. The drive system as claimed in claim 2, wherein the air or oxygen tank is connected by a second activatable valve to an air line leading to the fuel cell.

4. The drive system as claimed in claim 3, wherein a control device is configured to activate the first activatable valve and the second activatable valve to open in response to the failure of the electrical energy store.

5. The drive system as claimed in claim 1, wherein the additional hydrogen tank has a first capacity and is configured to be filled with a first amount of hydrogen and the air or oxygen tank has a second capacity and is configured to be filled with a second amount of air or oxygen such that the additional hydrogen mass flow supplied by the additional hydrogen tank and the additional air or oxygen mass flow supplied by the air or oxygen tank are sufficient to compensate for a loss of an additional drive power provided by the electrical energy store for a time period required for landing.

6. An aircraft with the drive system as claimed in claim 1.

7. The aircraft as claimed in claim 6, comprising a fuselage with a passenger compartment.

8. The aircraft as claimed in claim 6, wherein the aircraft is a vertical takeoff aircraft.

9. A method for operating the aircraft as claimed in claim 6, wherein whenever the electrical energy store fails, the fuel cell is supplied with the additional hydrogen mass flow from the additional hydrogen tank and with the additional air or oxygen mass flow from the air or oxygen tank, in order to compensate at least partially for a loss of an additional drive power provided by the electrical energy store for landing.

10. The drive system as claimed in claim 1, wherein the additional hydrogen tank has a first capacity and is configured to be filled with a first amount of hydrogen, the air or oxygen tank has a second capacity and is configured to be filled with a second amount of air or oxygen, the first amount of hydrogen and the second amount of air or oxygen are based on a combined amount of hydrogen and air or oxygen used to generate the increased amount of power for a defined quantity of time during the takeoff or the landing, and the increased amount of power is based on a difference between a first amount of power of the first power and a second amount of power of the second power.

11. The drive system as claimed in claim 3, wherein the hydrogen line is configured to receive the hydrogen mass flow from the hydrogen tank and the additional hydrogen mass flow from an additional hydrogen line comprising the first activatable valve, and wherein the air line is separate from the hydrogen line.

12. The drive system as claimed in claim 3, wherein the fuel cell is configured to receive the additional hydrogen mass flow after the control device activates the first activatable valve, and wherein the control device is further configured to deactivate the first activatable valve and the second activatable valve after a defined quantity of time.

* * * * *